(12) United States Patent
Hardy

(10) Patent No.: US 11,292,433 B1
(45) Date of Patent: Apr. 5, 2022

(54) INTERIOR WINDSHIELD WIPER APPARATUS

(71) Applicant: LuAnn Hardy, Columbus, OH (US)

(72) Inventor: LuAnn Hardy, Columbus, OH (US)

( * ) Notice: Subject to any disclaimer, the term of this patent is extended or adjusted under 35 U.S.C. 154(b) by 0 days.

(21) Appl. No.: 17/149,271

(22) Filed: Jan. 14, 2021

(51) Int. Cl.
| | |
|---|---|
| *B60S 1/04* | (2006.01) |
| *B60S 1/52* | (2006.01) |
| *B60S 1/08* | (2006.01) |
| *B60S 1/50* | (2006.01) |
| *B60S 1/26* | (2006.01) |

(52) U.S. Cl.
CPC ............... *B60S 1/0452* (2013.01); *B60S 1/08* (2013.01); *B60S 1/26* (2013.01); *B60S 1/50* (2013.01); *B60S 1/524* (2013.01)

(58) Field of Classification Search
CPC .......... B60S 1/20; B60S 1/3404; B60S 1/524; B60S 1/38; B60S 2001/3837; B60S 2001/3831; B60S 1/08; B60S 1/26; B60S 1/50; B60S 1/0452; B60S 1/0497
USPC ... 15/250.04, 250.28, 250.29, 250.4, 250.11, 15/250.41, 250.24
See application file for complete search history.

(56) References Cited

U.S. PATENT DOCUMENTS

| | | |
|---|---|---|
| 3,448,480 A | 6/1969 | Couget |
| 4,023,422 A | 5/1977 | Jou |
| 4,987,636 A | 1/1991 | Jenn-Chyou |
| 5,105,501 A | 4/1992 | Douglas |
| D329,997 S | 10/1992 | Len |
| 5,570,923 A * | 11/1996 | Taylor ...................... B60S 1/34 15/250.04 |
| 6,092,259 A | 7/2000 | Reppert |
| 6,446,301 B1 | 9/2002 | Kemp |
| 9,975,523 B1 * | 5/2018 | Canela ...................... B60S 1/18 |
| 2008/0072392 A1 | 3/2008 | Capoano |

FOREIGN PATENT DOCUMENTS

GB 195779 4/1923

\* cited by examiner

*Primary Examiner* — Katina N. Henson

(57) ABSTRACT

An interior windshield wiper apparatus for cleaning the interior of an automobile windshield includes a housing with a pair of wiper apertures extending therethrough. An engagement member is coupled to the housing to selectively engage a dashboard of a vehicle adjacent a windshield. An electric motor is coupled within the housing. A gearbox and a wiper linkage are coupled to the electric motor to drive a pair of wiper arms. The wiper arms are pivotably coupled to the housing and extends through the pair of wiper apertures. A pair of wiper blades is coupled to the pair of wiper arms to clean the windshield of the vehicle as the pair of wiper arms pivots. A wiper button is coupled to the housing to activate the movement of the pair of wiper arms.

8 Claims, 5 Drawing Sheets

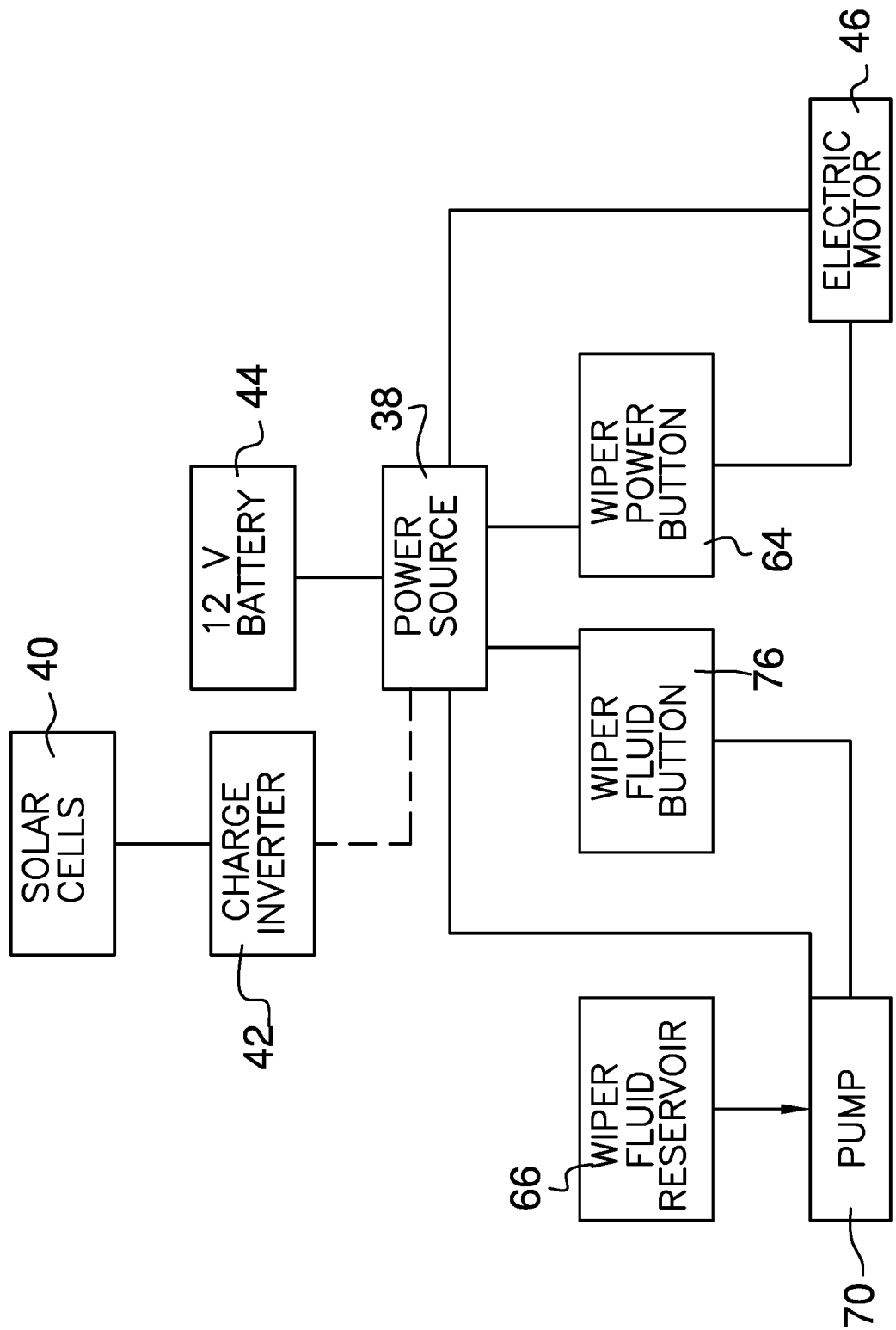

INTERIOR WINDSHIELD WIPER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to windshield cleaning devices and more particularly pertains to a new windshield cleaning device for cleaning the interior of an automobile windshield. The present device includes a solar powered housing with a pair of pivoting blades and a fluid dispenser.

(2) Description of Related Art Including Information Disclosed Under 37 CFR 1.97 and 1.98

The prior art relates to windshield cleaning devices. Known devices are often integrated into a windshield and are not available to position within a windshield as needed. Many known devices designed to clean the interior of a windshield also clean the exterior of the windshield. Other known devices move laterally along a track rather than creating a traditional pivoting movement.

BRIEF SUMMARY OF THE INVENTION

An embodiment of the disclosure meets the needs presented above by generally comprising a housing having a housing front side, a housing back side, a housing left side, a housing right side, a housing top side, and a housing bottom side. The housing top side has a pair of wiper apertures extending therethrough. An engagement member is coupled to the housing. The engagement member is coupled to the housing bottom side and is configured to selectively engage a dashboard of a vehicle adjacent a windshield of the vehicle. A power source is coupled to the housing. An electric motor is coupled within the housing. A gearbox is coupled within the housing and is in operational communication with the electric motor. A wiper linkage is coupled to the gearbox within the housing and extends from beneath the pair of wiper apertures. A pair of wiper arms is coupled to the housing. The pair of wiper arms is pivotably coupled to the housing backside and extends through the pair of wiper apertures. A pair of wiper blades is coupled to the pair of wiper arms. The pair of wiper blades is configured to contact and clean the windshield of the vehicle as the pair of wiper arms pivots. A wiper button is coupled to the housing. The wiper button is in operational communication with the electric motor to activate the movement of the pair of wiper arms.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 5 is a block diagram view of an embodiment of the disclosure.

DETAILED DESCRIPTION OF THE INVENTION

Figure 1:
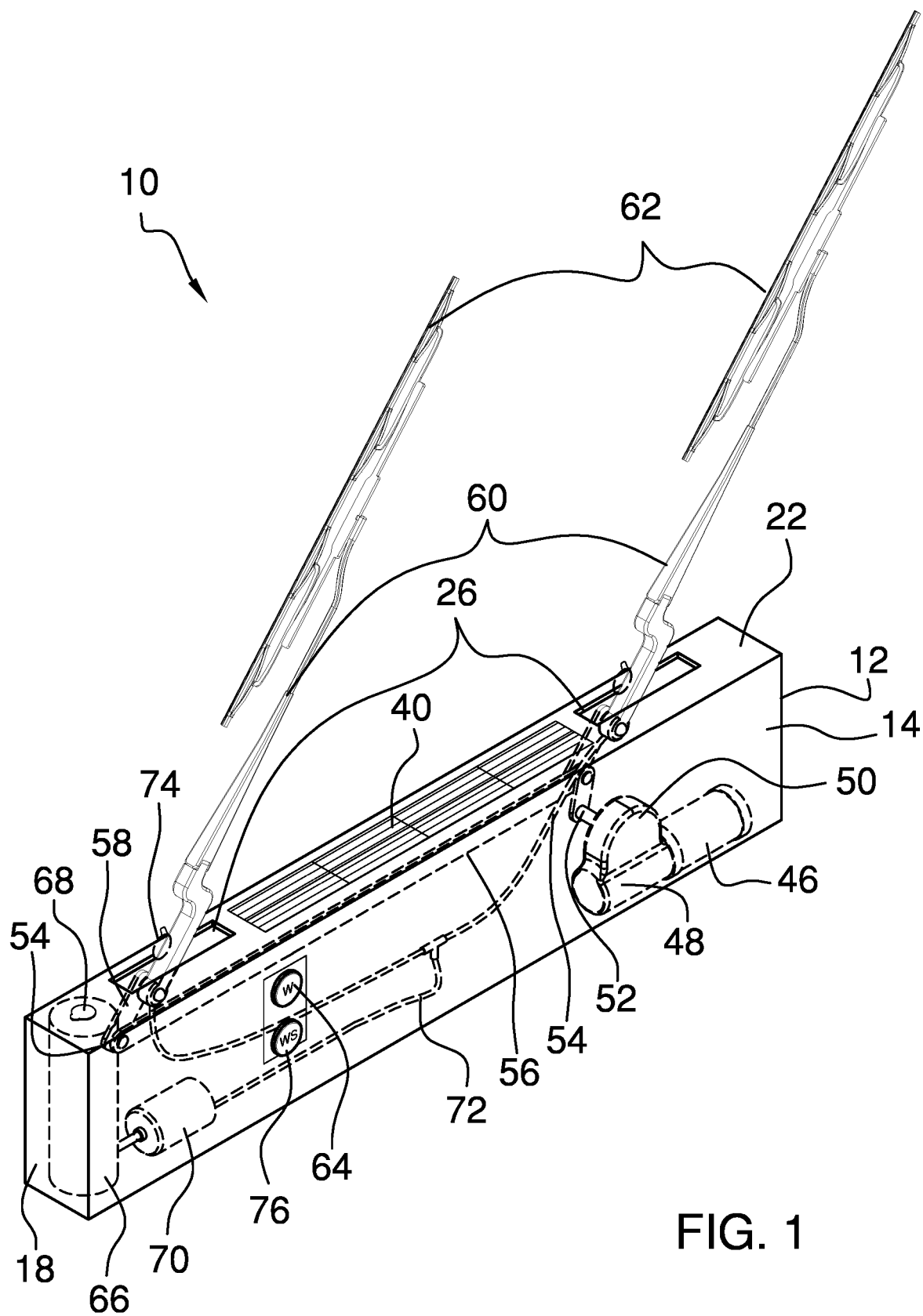
FIG. 1 is an isometric view of an interior windshield wiper apparatus according to an embodiment of the disclosure.
Figure 2:
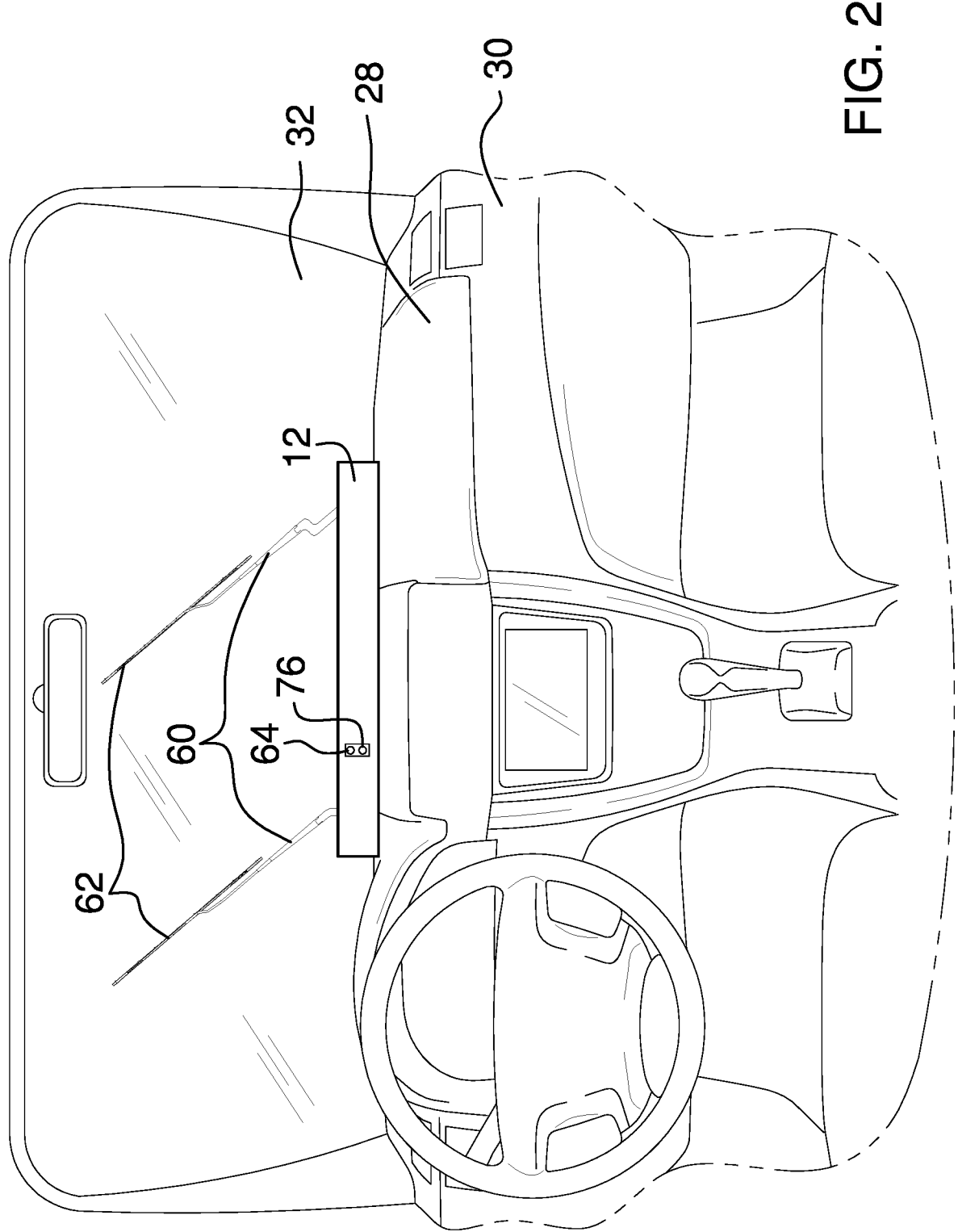
FIG. 2 is an in-use view of an embodiment of the disclosure.
Figure 3:
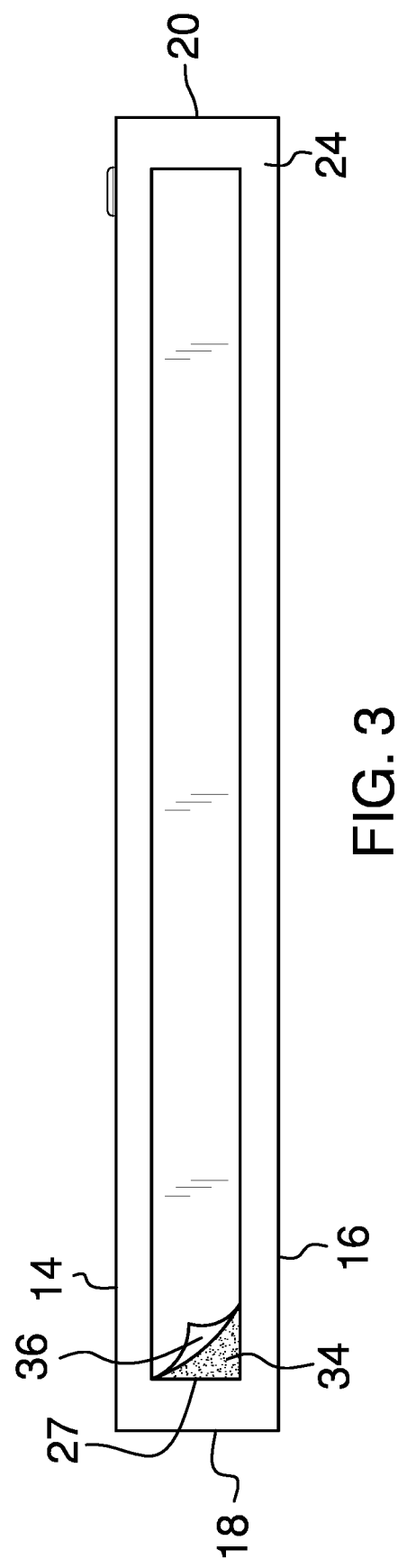
FIG. 3 is a bottom plan view of an embodiment of the disclosure.

With reference now to the drawings, and in particular to FIGS. 1 through 5 thereof, a new windshield cleaning device embodying the principles and concepts of an embodiment of the disclosure and generally designated by the reference numeral 10 will be described.

As best illustrated in FIGS. 1 through 5, the interior windshield wiper apparatus 10 generally comprises a housing 12 having a housing front side 14, a housing back side 16, a housing left side 18, a housing right side 20, a housing top side 22, and a housing bottom side 24. The housing top side 22 has a pair of wiper apertures 26 extending therethrough. The housing 12 may be rectangular prismatic and the pair of wiper apertures 26 may be rectangular.

Figure 4:
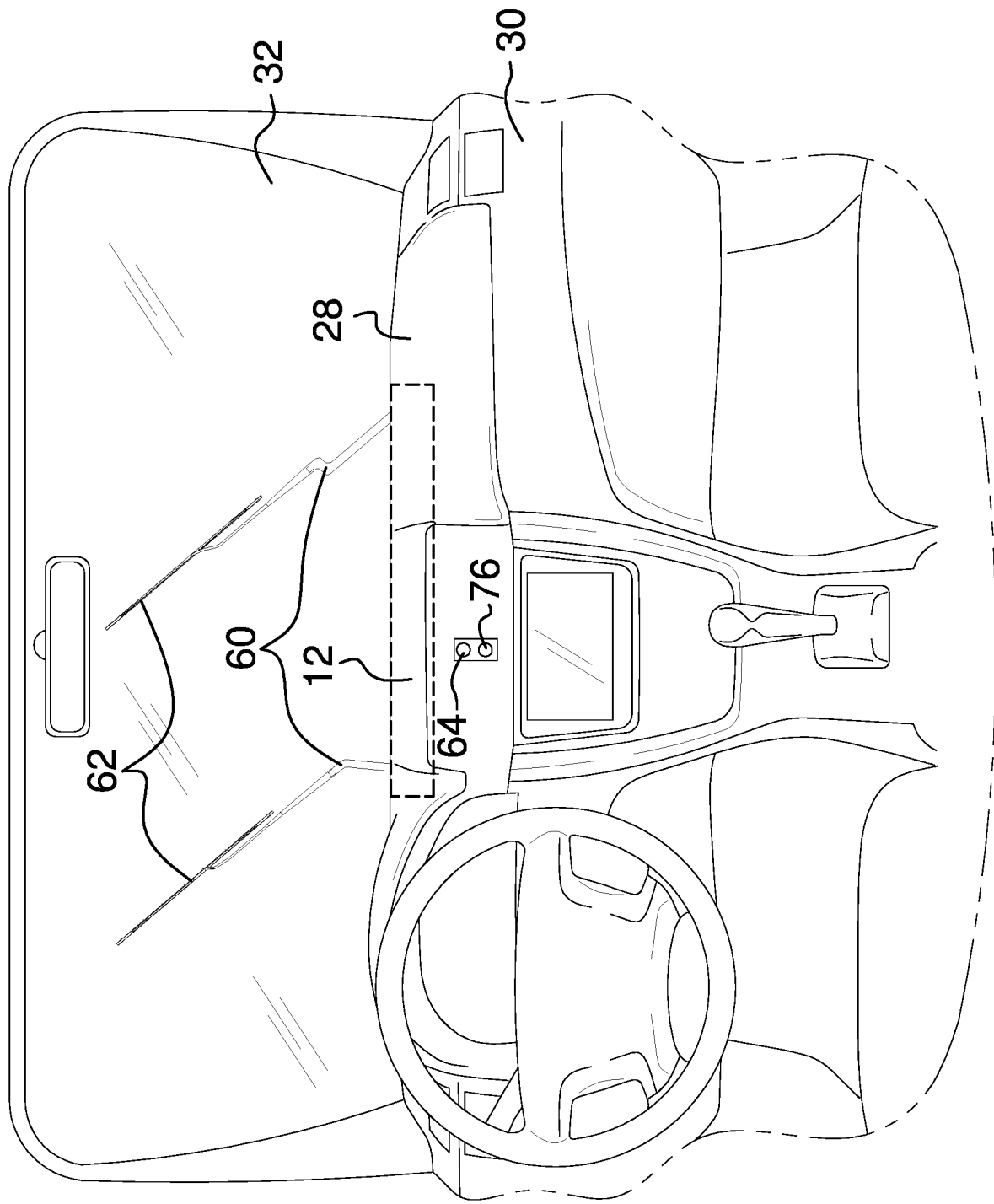
FIG. 4 is an in-use view of an embodiment of the disclosure.

An engagement member 27 is coupled to the housing 12. The engagement member 27 is coupled to the housing bottom side 24 and is configured to selectively engage a dashboard 28 of a vehicle 30 adjacent a windshield 32 of the vehicle. The engagement member 27 may be a selectively engageable fastener such as, but not limited to, an adhesive strip 34 with a peel-off backing 36, hook-and-loop fasteners, and the like. The housing 12 may alternatively be coupled within the dashboard 28 as shown in FIG. 4.

A power source 38 is coupled to the housing 12. The power source 38 may include a solar panel 40 coupled to the housing top side 22 and extending between the pair of wiper apertures 26. The power source 38 may also include a charge inverter 42 and a 12V battery 44 in operational communication with the solar panel 40 to store power in low light conditions. The power source 38 may directly draw power from the vehicle 30.

An electric motor 46 is coupled within the housing 12 and is in operational communication with the power source 38. A gearbox 48 is coupled within the housing 12 and is in operational communication with the electric motor 46. The gearbox 48 may include a semi-circular portion 50 to perpendicularly translate the rotational movement of the electric motor 46 and an arm portion 52 to translate the movement to a lateral back-and-forth motion.

A wiper linkage 54 is coupled to the gearbox 48. The wiper linkage 54 is coupled within the housing 12 and may include a lateral linkage bar 56 extending from beneath the pair of wiper apertures 26. A pair of arm bars 58 may be coupled to a pair of distal ends 59 of the lateral linkage bar 56.

A pair of wiper arms 60 is coupled to the housing 12. The pair of wiper arms 60 is pivotably coupled to the housing backside 16 and extends through the pair of wiper apertures 26. The pair of arm bars 58 of the wiper linkage are in operational communication with the pair of wiper arms 60 to create a repetitive pivoting motion through a fixed angle range without contacting the housing 12. A pair of wiper blades 62 is coupled to the pair of wiper arms 60 and is configured to contact and clean the windshield 32 of the vehicle as the pair of wiper arms 60 pivots. A wiper button 64 is coupled to the housing 12 and is in operational communication with the electric motor 46 to activate the movement of the pair of wiper arms 60.

A fluid reservoir 66 may be coupled within the housing 12 and has a fill aperture 68 extending through the housing top side 22. A pump 70 is coupled within the housing 12 and is in operational communication with the fluid reservoir 66. A fluid tube 72 is coupled within the housing 12 and extends from the pump 70 to a pair of spray nozzles 74 coupled to the pair of wiper arms 60. A fluid button 76 is coupled to the housing 12 and is in operational communication with the pump to draw windshield washer fluid from the fluid reservoir 66 to be sprayed out of the pair of spray nozzles 74. The fluid button 76 may be coupled to the housing front side 14 beneath the wiper button 64. Should the housing 12 be coupled within the dashboard 28, the fluid button 76 and the wiper button 64 may be coupled directly to the dashboard 28 as shown in FIG. 4.

In use, the fluid button 76 and the wiper button 64 are activated as needed to clean the interior of the windshield 32.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An interior windshield wiper apparatus comprising:
    a housing having a housing front side, a housing back side, a housing left side, a housing right side, a housing top side, and a housing bottom side, the housing top side having a pair of wiper apertures extending therethrough;
    an engagement member coupled to the housing, the engagement member being coupled to the housing bottom side and configured to selectively engage a dashboard of a vehicle adjacent a windshield of the vehicle;
    a power source coupled to the housing;
    an electric motor coupled within the housing;
    a gearbox coupled within the housing, the gearbox being in operational communication with the electric motor;
    a wiper linkage coupled to the gearbox, the wiper linkage being coupled within the housing and extending from beneath the pair of wiper apertures;
    a pair of wiper arms coupled to the housing, the pair of wiper arms being pivotably coupled to the housing backside and extending through the pair of wiper apertures;
    a pair of wiper blades coupled to the pair of wiper arms, the pair of wiper blades being configured to contact and clean the windshield of the vehicle as the pair of wiper arms pivots;
    a wiper button coupled to the housing, the wiper button being in operational communication with the electric motor to activate a movement of the pair of wiper arms; and
    the power source including a solar panel coupled to the housing top side and extending between the pair of wiper apertures, the power source including a charge inverter and a 12V battery in operational communication with the solar panel.

2. The interior windshield wiper apparatus of claim 1 further comprising the engagement member being an adhesive strip having a peel-off backing.

3. The interior windshield wiper apparatus of claim 1 further comprising the gearbox having a semi-circular portion perpendicularly translating a rotational movement of the electric motor and an arm portion translating the rotational movement to a lateral back-and-forth motion.

4. The interior windshield wiper apparatus of claim 1 further comprising a fluid reservoir coupled to the housing, the fluid reservoir being coupled within the housing and having a fill aperture extending through the housing, a pump coupled within the housing, the pump being in operational communication with the fluid reservoir; a fluid tube coupled within the housing, the fluid tube extending from the pump to a pair of spray nozzles coupled to the pair of wiper arms; a fluid button coupled to the housing, the fluid button being in operational communication with the pump to draw windshield washer fluid from the fluid reservoir to be sprayed out of the pair of spray nozzles.

5. The interior windshield wiper apparatus of claim 4 further comprising the fill aperture extending through the housing top side and having a fill plug selectively engageable within the fill aperture.

6. The interior windshield wiper apparatus of claim 4 further comprising the fluid button being coupled to the housing front side beneath the wiper button.

7. The interior windshield wiper apparatus of claim 4 further comprising the fluid button and the wiper button being configured to be coupled to the dashboard of the vehicle.

8. An interior windshield wiper apparatus comprising:
a housing having a housing front side, a housing back side, a housing left side, a housing right side, a housing top side, and a housing bottom side, the housing top side having a pair of wiper apertures extending therethrough;
an engagement member coupled to the housing, the engagement member being coupled to the housing bottom side and configured to selectively engage a dashboard of a vehicle adjacent a windshield of the vehicle, the engagement member being an adhesive strip having a peel-off backing;
a power source coupled to the housing, the power source including a solar panel coupled to the housing top side and extending between the pair of wiper apertures, the power source including a charge inverter and a 12V battery in operational communication with the solar panel;
an electric motor coupled within the housing;
a gearbox coupled within the housing, the gearbox being in operational communication with the electric motor, the gearbox having a semi-circular portion perpendicularly translating a rotational movement of the electric motor and an arm portion translating the rotational movement to a lateral back-and-forth motion;
a wiper linkage coupled to the gearbox, the wiper linkage being coupled within the housing and extending from beneath the pair of wiper apertures;
a pair of wiper arms coupled to the housing, the pair of wiper arms being pivotably coupled to the housing backside and extending through the pair of wiper apertures;
a pair of wiper blades coupled to the pair of wiper arms, the pair of wiper blades being configured to contact and clean the windshield of the vehicle as the pair of wiper arms pivots;
a wiper button coupled to the housing, the wiper button being in operational communication with the electric motor to activate the movement of the pair of wiper arms;
a fluid reservoir coupled to the housing, the fluid reservoir being coupled within the housing and having a fill aperture extending through the housing, a pump coupled within the housing, the pump being in operational communication with the fluid reservoir;
a fluid tube coupled within the housing, the fluid tube extending from the pump to a pair of spray nozzles coupled to the pair of wiper arms; and
a fluid button coupled to the housing, the fluid button being in operational communication with the pump to draw windshield washer fluid from the fluid reservoir to be sprayed out of the pair of spray nozzles, the fluid button being coupled to the housing front side beneath the wiper button.

\* \* \* \* \*